US012136749B2

(12) United States Patent
Matsuda et al.

(10) Patent No.: US 12,136,749 B2
(45) Date of Patent: Nov. 5, 2024

(54) SEAL STRUCTURE FOR FUEL CELL SEPARATOR

(71) Applicant: NOK CORPORATION, Tokyo (JP)

(72) Inventors: Taisuke Matsuda, Fujisawa (JP); Shigeru Watanabe, Fujisawa (JP)

(73) Assignee: NOK CORPORATION (JP)

( * ) Notice: Subject to any disclaimer, the term of this patent is extended or adjusted under 35 U.S.C. 154(b) by 470 days.

(21) Appl. No.: 17/607,054

(22) PCT Filed: Aug. 24, 2020

(86) PCT No.: PCT/JP2020/031811
§ 371 (c)(1),
(2) Date: Oct. 28, 2021

(87) PCT Pub. No.: WO2021/049280
PCT Pub. Date: Mar. 18, 2021

(65) Prior Publication Data
US 2022/0231310 A1 Jul. 21, 2022

(30) Foreign Application Priority Data
Sep. 9, 2019 (JP) .................. 2019-163737

(51) Int. Cl.
*H01M 8/0276* (2016.01)
(52) U.S. Cl.
CPC ................. *H01M 8/0276* (2013.01)
(58) Field of Classification Search
CPC .................................. H01M 8/0276
See application file for complete search history.

(56) References Cited

U.S. PATENT DOCUMENTS

| 7,749,635 B2 | 7/2010 | Kuroki et al. |
| 7,799,484 B2 | 9/2010 | Kuroki et al. |
| 10,511,034 B2 | 12/2019 | Horimoto et al. |

(Continued)

FOREIGN PATENT DOCUMENTS

| DE | 102013020840 A1 | 6/2015 |
| JP | 2003-056704 A | 2/2003 |

(Continued)

OTHER PUBLICATIONS

International Search Report (English and Japanese) of the International Searching Authority issued in PCT/JP2020/031811, mailed Nov. 2, 2020; ISA/JP (7 pages).

(Continued)

*Primary Examiner* — Sarah A. Slifka
(74) *Attorney, Agent, or Firm* — Harness, Dickey & Pierce, P.L.C.

(57) ABSTRACT

A seal structure is provided that follows fluctuations in a gap between a pair of fuel cell separators without generating a large tightening force. A pair of separators facing each other with an electrolyte membrane as a mating member interposed therebetween have beads which form a flow path for fluid between the beads and the electrolyte membrane in close contact with the electrolyte membrane. A seal which seals the pair of separators causes the beads 14 of the pair of these separators to overlap each other in a nested manner. A seal material having elasticity is provided between side walls of the respective beads which face each other. When the gap between the pair of separators fluctuates, the seal material deforms in a shearing direction.

12 Claims, 7 Drawing Sheets

(56) References Cited

U.S. PATENT DOCUMENTS

| | | |
|---|---|---|
| 2004/0075224 A1 | 4/2004 | Kuroki et al. |
| 2007/0148524 A1 | 6/2007 | Kuroki et al. |
| 2007/0148525 A1 | 6/2007 | Kuroki et al. |
| 2007/0154769 A1 | 7/2007 | Kuroki et al. |
| 2007/0190390 A1 | 8/2007 | Kuroki et al. |
| 2017/0365863 A1 | 12/2017 | Horimoto et al. |

FOREIGN PATENT DOCUMENTS

| | | |
|---|---|---|
| JP | 2007-333126 A | 12/2007 |
| JP | 2008-047313 A | 2/2008 |
| JP | 2012-028151 A | 2/2012 |
| JP | 2015-109225 A | 6/2015 |
| JP | 2016-143479 A | 8/2016 |
| JP | 2016-192339 A | 11/2016 |
| JP | 2016-219166 A | 12/2016 |

OTHER PUBLICATIONS

Written Opinion for corresponding International Application No. PCT/JP2020/031811 dated Nov. 2, 2020, with English translation (7 Pages).

SEAL STRUCTURE FOR FUEL CELL SEPARATOR

CROSS REFERENCE TO RELATED APPLICATIONS

This application is a U.S. National Phase Application under 35 U.S.C. 371 of International Application No. PCT/JP2020/031811, filed on Aug. 24, 2020, which claims priority to Japanese Patent Application No. 2019-163737, filed on Sep. 9, 2019. The entire disclosures of the above applications are expressly incorporated by reference herein.

BACKGROUND

Technical Field

The disclosure relates to a seal structure for a fuel cell separator.

Related Art

Fuel cells which generate electric power by electrochemical reaction of reaction gas are rapidly becoming widespread. The fuel cells have been attracting attention as a preferable energy source because they are high in power generation efficiency and have little impact on the environment.

Among the fuel cells, the solid polymer type has a stack structure in which a plurality of fuel battery cells are stacked. Each individual fuel battery cell has a membrane electrode assembly (MEA) sandwiched between a pair of separators. The membrane electrode assembly is of a structure in which an electrolyte membrane is sandwiched between an anode electrode and a cathode electrode. Each electrode has a stacked structure of a catalyst layer and a gas diffusion layer (GDL). The separator is in close contact with the gas diffusion layer and forms a flow path for hydrogen and oxygen between the separator and the gas diffusion layer.

Such a fuel battery cell uses the flow path formed in the separator to supply hydrogen to the anode electrode and oxygen to the cathode electrode. Consequently, power is generated by the electrochemical reaction opposite to the electrolysis of water.

As shown in the respective figures of Japanese Patent Application Laid-Open No. 2016-143479, the electrolyte membrane (reference numeral 55 in JP 2016-143479) of the membrane electrode assembly is sealed at the end thereof. As the seal, for example, such gaskets (gasket bodies 21, 31) as described in JP 2016-143479 are used. The gasket elastically deforms in a direction orthogonal to the surface of the separator and seals the electrolyte membrane of the membrane electrode assembly between the pair of separators. Since a seal structure using such gaskets generates a certain degree of tightening force, it is suitable for use in separators made of metal.

As another configuration example of sealing the electrolyte membrane of the membrane electrode assembly, an adhesive seal or a sticking seal may be used. Since these seals do not require a large tightening force, they can also be applied to brittle separators such as those made of carbon.

Since the fuel cell is raised in temperature by power generation, a gap between the pair of separators that sandwich the membrane electrode assembly therebetween is easy to fluctuate. Therefore, a seal relatively high in hardness such as an adhesive seal or a sticking seal cannot follow the fluctuation in the gap, and has the possibility of causing peeling off from the separator or breakage or the like in the case of a brittle separator.

On the other hand, in the case of a gasket using a rubber-like elastic material relatively low in hardness, as mentioned above, it is strong in tightening force and is not suitable for application to the brittle separator.

A seal structure that can follow fluctuations in a gap between a pair of fuel cell separators without generating a large tightening force is required.

SUMMARY

One aspect of a seal structure for a fuel cell separator includes a pair of separators facing each other with a mating member interposed therebetween and having beads forming a flow path for fluid between the separator and the mating member in close contact with the mating member, and a seal provided with a seal material having elasticity between side walls of the beads of the pair of separators, which are overlapped in a nested manner and facing each other.

Effect

It is possible to realize a seal structure which can follow fluctuations in a gap between a pair of separators without generating a large tightening force.

DETAILED DESCRIPTION

An embodiment of a seal structure for a fuel cell separator will be introduced.

First Embodiment

A first embodiment will be described based on FIGS. 1 to 4.

Figure 1:
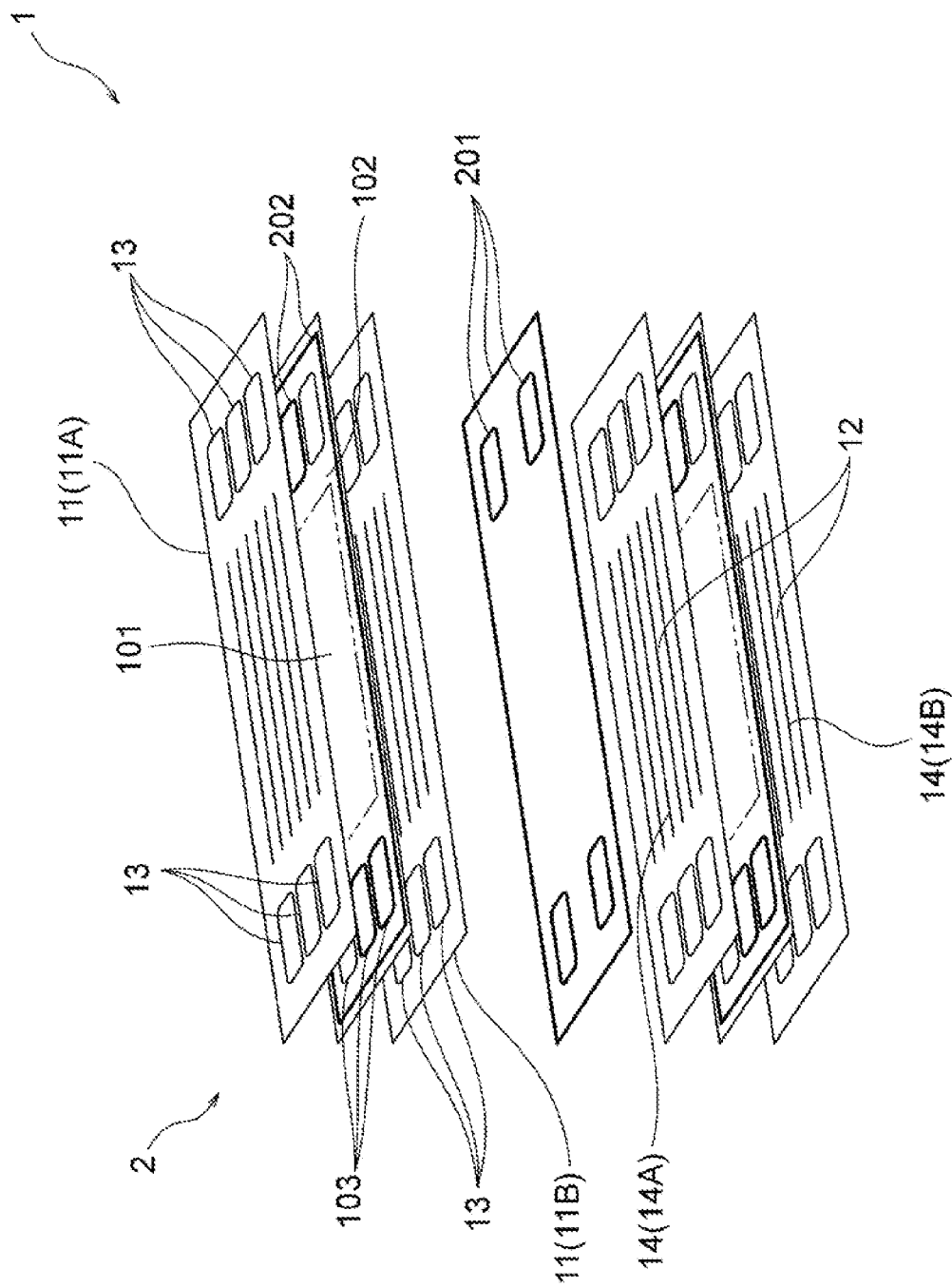
FIG. 1 is a schematic view conceptually showing a stack structure in which a plurality of fuel battery cells are stacked.

As shown in FIG. 1, a fuel cell 1 has a stacked structure in which a plurality of fuel battery cells 2 are stacked. In the fuel battery cell 2, an electrolyte membrane 102 provided with a membrane electrode assembly 101 called a MEA is interposed between a pair of separators 11 for the fuel cell. Such fuel battery cells 2 are stacked through a cooling surface seal 201 as a seal. In FIG. 1, only two sets of fuel battery cells 2 are drawn, but in reality, hundreds of sets of fuel battery cells 2 are stacked to constitute the fuel cell 1.

The membrane electrode assembly 101 is a structure in which electrodes not shown in the drawing are provided at the central portions of both surfaces of the electrolyte membrane 102. The electrode has a stacked structure having a catalyst layer formed on the electrolyte membrane 102 and a gas diffusion layer (GDL) formed on the catalyst layer (neither is shown). In such an electrode, one surface of the electrolyte membrane 102 is used as an anode electrode, and the surface opposite thereto is used as a cathode electrode.

The separator 11 for the fuel cell is a flat plate-shaped member formed of a resin such as carbon as an example. However, the separator is not limited to the brittle member like such a carbon-made one. As another example, a flat plate-like member that can be pressed, such as a thin stainless steel plate, may be used as the separator 11.

The separator 11 has a rectangular planar shape and is provided with an arrangement region 12 for arranging the membrane electrode assembly 101. Openings provided three by three at positions of both ends out of the arrangement region 12 are manifolds 13 for circulating fluid used for power generation or generated by power generation. The fluid caused to flow through the manifolds 13 is a fuel gas (hydrogen), an oxidizing gas (oxygen), water generated by electrochemical reaction during power generation, an excess oxidizing gas, a refrigerant, or the like.

The manifolds 103 are provided even on the electrolyte membrane 102 in alignment with the manifolds 13 provided on the separator 11. These manifolds 103 are openings which are respectively provided three at positions of both ends away from the membrane electrode assembly 101.

The fuel cell 1 uses the manifolds 13 and 103 to introduce the fuel gas (hydrogen) between the electrolyte membrane 102 provided with the membrane electrode assembly 101 and the separator 11A facing one surface of the electrolyte membrane 102, and to introduce the oxidizing gas (oxygen) between the electrolyte membrane 102 and the separator 11B facing the surface opposite to one surface of the electrolyte membrane 102. Cooling water used as the refrigerant is introduced between the two sets of fuel battery cells 2 sealed by the cooling surface seal 201. At this time, the fuel gas, the oxidizing gas, and the cooling water flow through respective flow paths formed by the pair of separators 11 (11A, 11B) that assemble the fuel battery cell 2.

The pair of separators 11 face each other with the electrolyte membrane 102 as a mating member interposed therebetween to form the fuel battery cells 2. The separator 11 includes a bead 14 that forms a fluid flow path between the separator and the electrolyte membrane 102 in close contact with the electrolyte membrane 102. A space between the electrolyte membrane 102 and the bead 14A of the separator 11A forms a flow path for the fuel gas. A space between the electrolyte membrane 102 and the bead 14B of the separator 11B forms a flow path for the oxidizing gas. A space between the beads 14A and 14B provided between the separator 11A of one set of fuel battery cells 2 and the separator 11B of the set of fuel battery cells 2 overlapping the separator 11A forms a flow path for the cooling water.

The fuel battery cell 2 has a seal structure at the outer peripheral edges of the separator 11 and the membrane electrode assembly 101, and at the peripheral edges of the manifolds 13 and 103. The seal structure includes a cooling surface seal 201 interposed between the two sets of fuel battery cells 2 and a reaction surface seal 202 as a seal provided between the separator 11 and the membrane electrode assembly 101. In such a seal structure, the flow path for the fuel gas and the surplus fuel gas, the flow path for the oxidizing gas and the water generated by the electrochemical reaction at the power generation, and the flow path for the cooling water as the refrigerant are made independent of each other to prevent mixing of different types of fluids.

Figure 2:
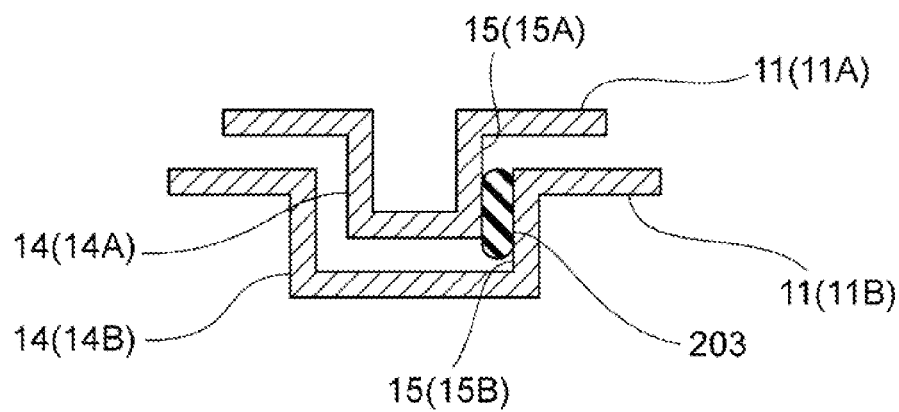
FIG. 2 is a vertical cross-sectional view of a seal structure that seals a gap between a pair of separators.

As shown in FIG. 2, in a portion where the cooling surface seal 201 and the reaction surface seal 202 are provided, the beads 14 of the separators 11 are overlapped in a nested manner. As an example, the bead 14B of the separator 11B facing the surface opposite to one surface of the electrolyte membrane 102 is formed larger than the bead 14A of the separator 11A facing one surface of the electrolyte membrane 102 provided with the membrane electrode assembly 101. The bead 14A has entered the bead 14B in a non-contact state.

A seal material 203 having elasticity forms the cooling surface seal 201 and the reaction surface seal 202. As an example, as the seal material 203, a gasket formed of a rubber-like elastic material like low-hardness vulcanized rubber is used. Such a seal material 203 is arranged and fixed between side walls 15 of the beads 14 (14A, 14B) facing each other by overlapping in the nested manner.

Various embodiments are allowed to fix the seal material 203.

One allowable embodiment is a form to cause the seal material 203 to have stickiness that it is stuck to the side wall 15 of the bead 14. As a method for that purpose, in the seal structure of the present embodiment, the seal material 203 is molded by a rubber molded product having stickiness, and the seal material 203 itself is caused to have stickiness.

As rubber having stickiness, for example, a rubber-based sticking agent using, as base polymer, butyl rubber, polyisobutylene rubber, styrene-butadiene rubber, ethylenepropylene diene rubber, natural rubber, or the like can be used.

It is also possible to blend rubber that becomes a material for the seal material 203 with additives. The additives that can be blended include, for example, cross-linking agents, tackifiers, fillers, anti-aging agents, and the like.

As another embodiment in which the seal material 203 is caused to have stickiness that it sticks to the side wall 15 of the bead 14, for example, it is also possible to cause the seal material 203 to have a multi-layer structure of a low-hardness vulcanized rubber and a sticking layer (refer to a fourth embodiment). In this case as well, the above-mentioned butyl rubber or the like can be used as rubber having stickiness, and various additives can also be blended.

Another embodiment allowed to fix the seal material 203 is a form to give adhesiveness or tackiness to the separator 11 and fix the seal material 203.

For example, there may be mentioned an aspect in which a sticking agent is formed on a side wall 15A inside the bead 14A of the separator 11A to fix the seal material 203, and the seal material 203 is brought into close contact with a side wall 15B outside the bead 14B of the separator 11B. There may also be mentioned an aspect in which a sticking agent is formed on a side wall 15B outside the bead 14B of the separator 11B to fix the seal material 203, and the seal material 203 is brought into close contact with the side wall 15A inside the bead 14A of the separator 11A. Alternatively, there may also be mentioned an aspect in which a sticking agent is formed on the side walls 15A and 15B inside the beads 14A and 14B of the separators 11A and 11B to fix the seal material 203.

Thus, when the sticking agent is formed on the bead 14, for example, a rubber-based sticking agent using, as the base polymer, butyl rubber, polyisobutylene rubber, styrene-butadiene rubber, ethylenepropylene diene rubber, natural rubber, or the like can be used as the sticking agent. Further, various additives such as cross-linking agents, tackifiers, fillers, anti-aging agents, and the like can also be blended.

The shaping of the sticking agent on the bead 14 can be realized by, for example, a method such as application by a dispenser, integral molding by injection molding or transfer molding, post-pasting of a sticking agent shaped by compression molding or the like, or the like.

A further embodiment allowed to fix the seal material 203 is a form to adhere the seal material 203 to the separator 11.

There may be mentioned an aspect in which the seal material 203 is adhered and fixed to the side wall 15A inside the bead 14A of the separator 11A with an adhesive, and the seal material 203 is brought into close contact with the side wall 15B outside the bead 14B of the separator 11B. There may also be mentioned an aspect in which the seal material 203 is adhered and fixed to the side wall 15B outside the bead 14B of the separator 11B with an adhesive, and the seal material 203 is brought into close contact with the side wall 15A inside the bead 14A of the separator 11A. Alternatively, there may also be mentioned an aspect in which the seal material 203 is adhered and fixed to the side walls 15A and 15B inside the beads 14A and 14B of the separators 11A and 11B with an adhesive.

In such a configuration, the seal structure of the present embodiment realizes a fluid seal by the seal material 203 interposed between the side walls 15 of the beads 14 of the separators 11 which are overlapped with each other in the nested manner. Therefore, the seal material 203 can be made to follow a fluctuation in a gap between the pair of separators 11 (11A, 11B) due to factors such as a temperature rise by power generation without generating a large tightening force. Hereinafter, description will be made while comparing with a comparative example.

Figure 3:
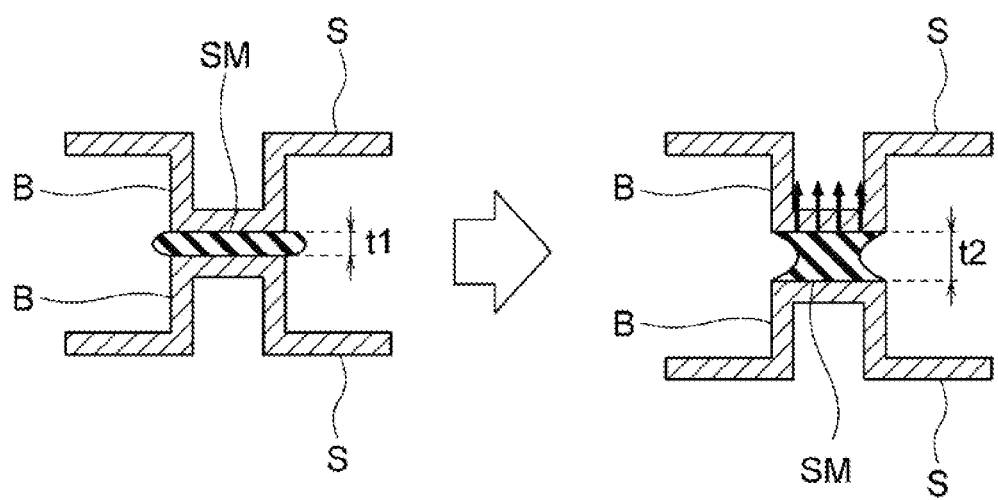
FIG. 3 is a vertical cross-sectional view showing a state of a seal structure of a comparative example when a gap between beads of a pair of separators fluctuates from a specified state in a direction of its expansion.

FIG. 3 shows a state of a seal structure of a comparative example when a gap between beads B of a pair of separators S fluctuates from a specified state in its expanding direction. In the seal structure of this comparative example, the beads B of the pair of separators S have the mutual tops brought into close contact with each other through a seal material SM. Therefore, when the gap between the beads B is expanded to a dimension t2 where a specified gap dimension between the beads B is assumed to be t1, the seal material SM is elongated correspondingly. Although not shown in the drawing, when the gap between the beads B is narrowed, the seal material SM is crushed correspondingly.

The seal structure of the comparative example described above causes sealing action by compressive deformation of the seal material SM. Due to such a structure, a large tightening force is generated between the beads B of the pair of separators S, and the tightening force also fluctuates greatly when the gap between the beads B fluctuates. Therefore, when a brittle material made of a resin such as carbon is used as the separators S, the separators S may be destroyed.

Figure 4:
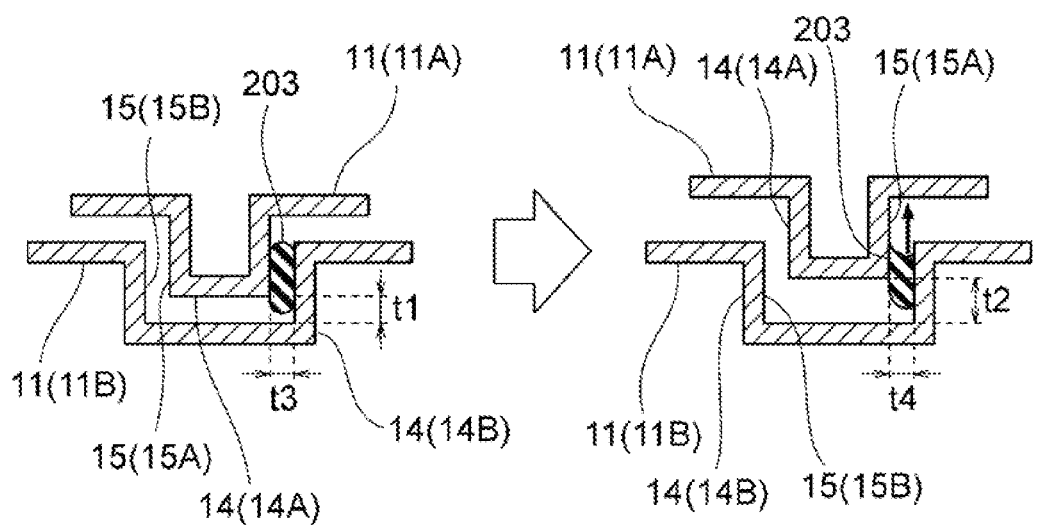
FIG. 4 is a vertical cross-sectional view showing a state of a seal structure of the present embodiment when a gap between beads of a pair of separators fluctuates from a specified state in a direction of its expansion.

FIG. 4 shows a state of the seal structure of the present embodiment when the gap between the beads 14 of the pair of separators 11 fluctuates from the specified state in its expanding direction. Even if the gap dimension between the pair of separators 11 changes from t1 to t2 as in the case of the comparative example, the dimension between the side walls 15 of the beads 14 between which the seal material 203 is interposed does not change. The initial dimension t3 between the side walls 15 and the dimension t4 between the side walls 15 when the distance between the two separators 11 fluctuates remain in agreement. At this time, a shearing force is generated in the seal material 203, and a larger force than the compressive force is unlikely to act on the bead 14 of the separator 11. Therefore, it is possible to obtain the seal structure that can follow the fluctuation in the gap between the pair of separators 11 without generating the large tightening force, and it is also possible to use the brittle separator 11 made of the resin such as carbon.

Second Embodiment

Figure 5:
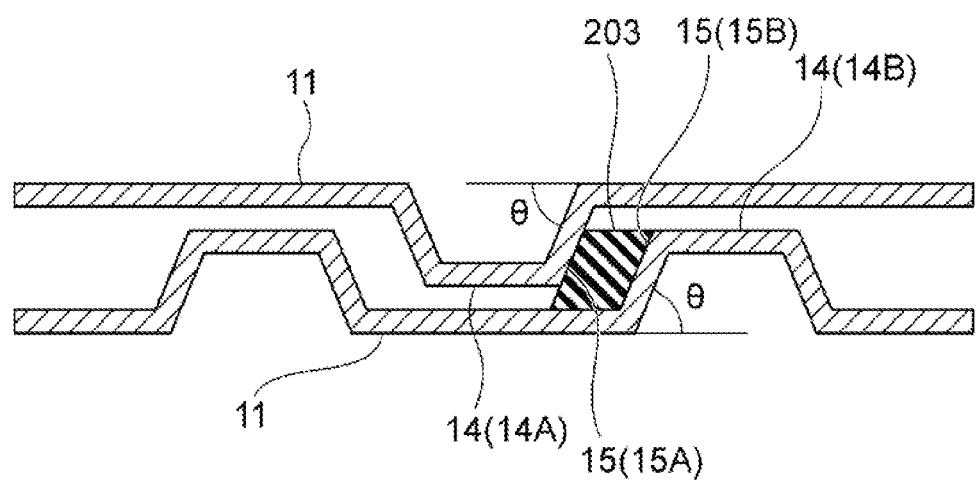
FIG. 5 is a vertical cross-sectional view showing another example of separators for a fuel cell.

A second embodiment will be described based on FIG. 5. The same parts as those in the first embodiment are designated by the same reference numerals, and a description thereof will also be omitted.

As shown in FIG. 4, the present embodiment relates to a rising angle $\theta$ from the separator 11 of the side wall 15 of each of the beads 14 facing each other of the pair of separators 11. The rising angle $\theta$ from the separator 11 of the side wall 15 in the first embodiment is a right angle, i.e., 90°. It is desirable that the rising angle $\theta$ of the side wall 15 is in the range of 5 to 90°. The rising angle $\theta$ of the side wall 15 in the present embodiment is around 70°. That is, the side walls 15 of the beads 14 facing each other of the pair of separators 11 are inclined with respect to the separators 11.

The seal material 203 is a parallelogram in cross section, which is in contact with the surface of the separator 11 communicating with the side wall 15. Such a seal material 203 is stuck or adhered not only to the side wall 15 of the bead 14 but also to the surface of the separator 11 communicating with the side wall 15.

In such a configuration, since the side wall 15 of each of the beads 14 is inclined with respect to the separator 11, the seal material 203 can be interposed between these beads 14 only by moving the mutual beads 14 in the proximity direction to each other upon stacking the pair of separators 11 to assemble the fuel battery cell 2. Thus, it is possible to facilitate the assembly of the fuel battery cells 2 and the fuel cell 1.

Third Embodiment

Figure 6:
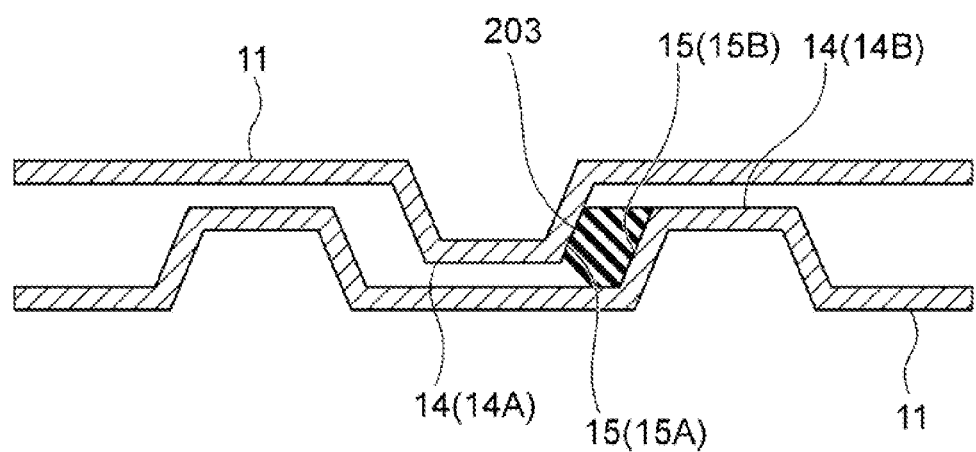
FIG. 6 is a vertical cross-sectional view showing a further example of separators for a fuel cell.

A third embodiment will be described based on FIG. 6. The same parts as those in the first and second embodiments are designated by the same reference numerals, and a description thereof will also be omitted.

In the seal structure of the present embodiment, the length of the seal material 203 which is stuck or adhered to the surface of the bead 14 of the separator 11 is made shorter than the length between the side walls 15 of the beads 14. Consequently, when the gap between the pair of separators 11 fluctuates, the seal material 203 becomes easy to deform in the shearing direction, and the stress applied to the separator 11 can be made smaller.

Fourth Embodiment

Figure 7:
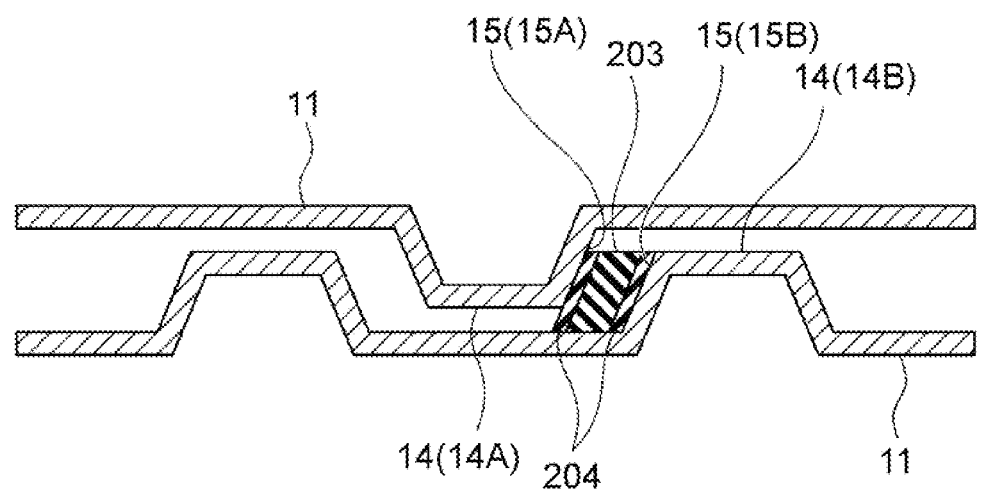
FIG. 7 is a vertical cross-sectional view showing yet another example of separators for a fuel cell.

A fourth embodiment will be described based on FIG. 7. The same parts as those in the first and second embodiments are identified by the same reference numerals, and a description thereof will also be omitted.

In the present embodiment, as a structure of fixing the seal material 203 to the separator 11, sticking layers 204 are each provided on the seal material 203 instead of forming the sticking agent on the side wall 15 of the bead 14. The seal material 203 is a low-hardness vulcanized rubber, and the sticking layer 204 is provided on the surface of the seal material 203 to be joined to the side wall 15 of the bead 14.

In such a configuration, the seal material 203 is adhered to the side wall 15B of the separator 11B by the sticking layer 204 on one side. By superimposing the separator 11A on the separator 11B in this state, the side wall 15A of the separator 11A is adhered to the sticking layer 204 on the opposite side. Thus, the seal material 203 is provided between the side walls 15A and 15B of the pair of stacked separators 11A and 11B.

In the present embodiment, since the sticking layer 204 is provided on the seal material 203 itself, it is not necessary to perform working for adhering and fixing the seal material 203 on the separator 11, and it is possible to facilitate manufacturing.

Modification Example

Various modifications and changes are allowed upon implementation.

For example, the angle of the bead 14 with respect to the separator 11 is not limited to 90° (first embodiment) and around 70° (second to fourth embodiments). It is possible to set it to various angles in the range of 5 to 90°. Further, in the pair of separators 11A and 11B constituting the fuel battery cell 2, the rising angles of the individual beads 14A and 14B do not have to match each other, and they may be raised at different angles.

Upon other implementations, any deformation or change is allowed.

The invention claimed is:

1. A seal structure for a fuel cell separator, comprising:
a pair of the separators facing each other with a mating member interposed therebetween and having beads forming a flow path for fluid between the separator and the mating member in close contact with the mating member; and
a seal provided with a seal material having elasticity between side walls of the beads of the pair of separators, which are overlapped in a nested manner and facing each other,
wherein the seal material has stickiness that the seal material is stuck to the side walls of the beads; and
wherein the seal material is also stuck to the surface of the separator which communicates with the side wall.

2. The seal structure for the fuel cell separator according to claim 1, wherein the side walls of the beads facing each other of the pair of separators respectively rise from the separators at an angle of 5 to 90°.

3. The seal structure for the fuel cell separator according to claim 2, wherein the side walls of the beads facing each other of the pair of separators are inclined with respect to the separators.

4. The seal structure for the fuel cell separator according to claim 3, wherein the seal material has stickiness that the seal material is stuck to the side walls of the beads.

5. The seal structure for the fuel cell separator according to claim 3, wherein the seal material is adhered to the side wall of the bead.

6. The seal structure for the fuel cell separator according to claim 2, wherein the seal material has stickiness that the seal material is stuck to the side walls of the beads.

7. The seal structure for the fuel cell separator according to claim 2, wherein the seal material is adhered to the side wall of the bead.

8. The seal structure for the fuel cell separator according to claim 1, wherein the seal material is a rubber molded product having stickiness.

9. The seal structure for the fuel cell separator according to claim 1, wherein the seal material has a sticking layer at a contact portion with respect to the side wall of the bead.

10. The seal structure for the fuel cell separator according to claim 1, wherein the seal material is adhered to the side wall of the bead.

11. A seal structure for a fuel cell separator, comprising:
a pair of the separators facing each other with a mating member interposed therebetween and having beads forming a flow path for fluid between the separator and the mating member in close contact with the mating member; and
a seal provided with a seal material having elasticity between side walls of the beads of the pair of separators, which are overlapped in a nested manner and facing each other,
wherein the seal material has stickiness that the seal material is stuck to the side walls of the beads;
wherein the seal material is a rubber molded product having stickiness; and
wherein the seal material is also stuck to the surface of the separator which communicates with the side wall.

12. A seal structure for a fuel cell separator, comprising:
a pair of the separators facing each other with a mating member interposed therebetween and having beads forming a flow path for fluid between the separator and the mating member in close contact with the mating member; and
a seal provided with a seal material having elasticity between side walls of the beads of the pair of separators, which are overlapped in a nested manner and facing each other,
wherein the seal material has stickiness that the seal material is stuck to the side walls of the beads;
wherein the seal material has a sticking layer at a contact portion with respect to the side wall of the bead; and
wherein the seal material is also stuck to the surface of the separator which communicates with the side wall.

* * * * *